United States Patent [19]
Maughlin

[11] 3,983,784
[45] Oct. 5, 1976

[54] ARMING-WIRE PULL-OUT EXTENSION MEMBER

[75] Inventor: Richard K. Maughlin, Great Mills, Md.

[73] Assignee: The United States of America as represented by the Secretary of the Navy, Washington, D.C.

[22] Filed: Oct. 9, 1974

[21] Appl. No.: 513,374

[52] U.S. Cl. .................................. 89/1.5 D; 102/2
[51] Int. Cl.² .................. B64D 1/04; F41F 5/02
[58] Field of Search ............ 24/115 H, 73 A, 81 A, 24/81 AG, 1.6; 89/1.5 D, 1.5 R, 1.812; 102/76, 2; 244/4

[56] References Cited
UNITED STATES PATENTS

| | | | |
|---|---|---|---|
| 2,341,457 | 2/1944 | Markey et al. | 89/1.5 D |
| 2,709,438 | 5/1955 | Murray | 24/115 H |
| 3,186,611 | 6/1965 | Sonderman | 24/115 H |
| 3,326,083 | 6/1967 | Johnson | 89/1.5 D |
| 3,492,911 | 2/1970 | Adams | 89/1.5 D |
| 3,575,084 | 4/1971 | Glendenning et al. | 89/1.5 D |
| 3,703,844 | 11/1972 | Bleikamp | 89/1.5 D |
| 3,712,169 | 1/1973 | Koff et al. | 89/1.5 D |

*Primary Examiner*—David H. Brown
*Attorney, Agent, or Firm*—R. Sciascia; R. Beers; S. Sheinbein

[57] ABSTRACT

Means permitting the fin-arming wire of a bomb to be permanently secured to the bomb at one end rather than to the bomb rack or anything affixed to the aircraft. The means comprises a wire or cable looped back on itself and looped thru a metal ring at one end. The ends of the wire are fastened together near the loop by a crimp band which supports a sliding sleeve to which a long coiled spring is attached, the spring encircling the doubled wire up to a point near the other end and forming a second loop of wire there. A second sliding sleeve encircles the doubled wire at this other end forming the second loop and the spring is also attached to the second sliding sleeve. The spring is compressible so that the second loop can be temporarily enlarged.

5 Claims, 4 Drawing Figures

ARMING-WIRE PULL-OUT EXTENSION MEMBER

BACKGROUND OF THE INVENTION

This invention relates to the arming of bombs and especially to a reusable, arming-wire pull-out and snag-prevention member.

Prior to the present invention, all positive fin-arming means required the securing of the arming wire to some point on the bomb rack. When the bomb was released, the arming wire was withdrawn from the fuse and remained on the bomb rack. The slip stream forces caused the wire to whip against the bomb rack and aircraft structure thereby causing structural damage.

SUMMARY OF THE INVENTION

The present invention comprises a cable bent back upon itself to form a first, small loop and a large loop. A biasing means, such as a coil spring, is placed around the cable with a collar inserted in each end of the spring. The spring's length in its normal relaxed condition is such as to decrease the size of the large loop so that it becomes a second small loop.

To use the invention, the spring is forced back so that the second small loop expands in size. This expanded loop can be hooked over the sway brace arm of a bomb rack. Releasing the spring then decreases the loop size so that it will not pass over the sway brace bolt and pad and therefore cannot be lost.

An arming wire is usually linked with the first small loop and one end affixed to the bomb.

An object of the invention is to prevent damage to an aircraft from dangling arming wires whipping about in the slip stream.

Another object is to provide a means by which the arming wire can be permanently affixed to the bomb which it arms.

Other objects, advantages, and novel features of the present invention will become apparent from the following detailed description of the invention when considered in conjunction with the accompanying drawings.

DETAILED DESCRIPTION OF THE INVENTION

Figure 1:
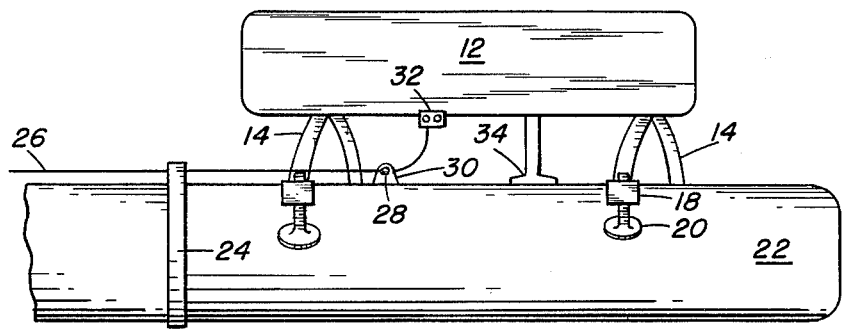
FIG. 1 is a schematic illustration of the prior art in the bomb-arming-wire field.

FIG. 1 shows a bomb rack 12 of an aircraft (not shown) which has sway brace arms 14 extending outwardly and downwardly therefrom. The bomb rack is shown spaced from the bomb 22 for purposes of clarity. In actual practice, the top surface of the bomb is adjacent to the bomb rack and hooks in the rack hold lugs in the top surface of the bomb. A sway brace bolt 16 is threaded thru a circular nut 18 at the end of each arm 14. A sway brace pad 20 is connected to the lower end of each bolt thru a ball-and-socket joint (not shown) which makes the pad pivotable to some extent. There are four pads in all and they are screwed down to make firm contact with the surface of the bomb 22 for the purpose of stabilizing it while it is being carried.

The stabilizing fins of the bomb 22 are at its rear (to the left in FIGS. 1 & 2) and are held in a wraparound, unerected state by a restraining band 24 which is kept closed by having a fin arming wire 26 running thru it. This wire is not attached to anything at the rear of the bomb 22. The wire 26 runs forward, usually thru an eye 28 in a tab 30 affixed to the bomb, and the forward end is permanently attached to the bomb rack 12 by an convenient attachment means such as a rivet plate 32, or hook, for example. When the bomb is released, the previously mentioned hooks in the bomb rack release their hold on the lugs in the bomb and an ejector foot 34 is operated to push the bomb sharply downward. As the bomb falls away, the fin arming wire 26 is pulled thru the restraining band 24 and thru the eye 28. When the wire is out of the band 24 completely, the band opens and allows the fins to erect. The fin arming wire 26 is left dangling from the wire attachment means 32.

Figure 2:
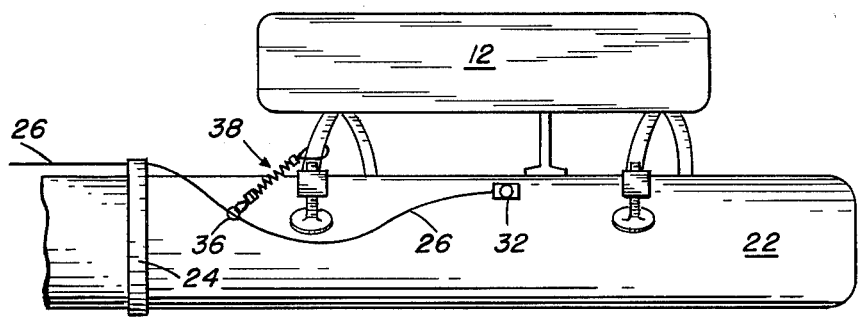
FIG. 2 is a schematic illustration of the present invention showing how it is used with a bomb.

In the present invention, as shown in FIG. 2, the wire attachment means 32 is placed on the surface of the bomb 22 and is threaded thru the ring 36 (arming-wire retaining ring) of the arming-wire pull-out extension member 38 which is coupled by means of a loop 40 to one of the sway brace arms 14. The member 38 keeps the wire 26 away from the arms 14 and pads 20 so that the wire does not entangle itself. When the bomb 22 is released, the extension member exerts the force applied to it by the weight of the bomb to pull the wire 26 out of the fin-restraining band 24. The wire 26 then slides out of the ring 36 and goes down with the bomb since it is attached to it by the attachment means 32.

Figure 3:
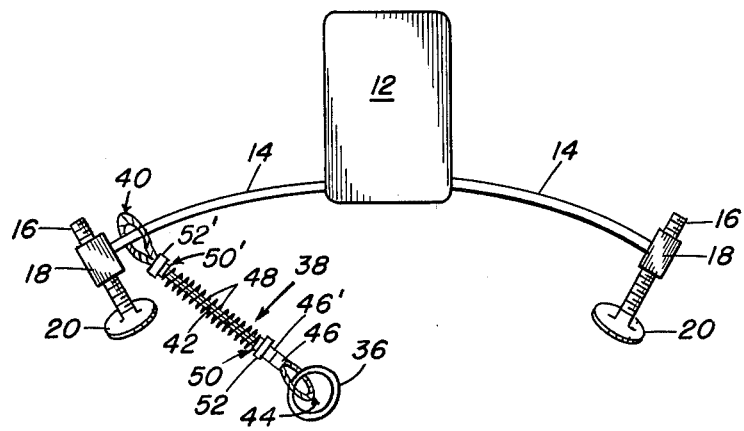
FIG. 3 is a schematic illustration of how an embodiment of the invention hooks over a sway brace arm and of the details of this embodiment.
Figure 4:
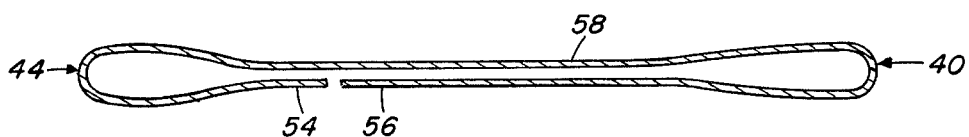
FIG. 4 is a schematic diagram illustrating where the free ends of the cable are placed for fastening.

The construction of a preferred embodiment of the invention is shown in FIG. 3. The extension member 38 comprises a cable 42, preferably of braided steel, which is doubled back on itself so that it has a sway-brace-arm attachment loop 40 and a ring attachment loop 44 and is fairly rigid in its longitudinal dimension although it bends laterally if some force is exerted. The ends of the cable 42 are fastened to the other side of the cable by means of swaging sleeves 46 and 46'. It should be noted that the free ends of the cable are fastened to the long side 58 nearer one end loop than the other so that the sway-brace-arm attachment loop 40 will be a large loop (see FIG. 4). A coil spring 48 is placed over the doubled cable 42 between the two loops 40 and 44. A collar 50 with a flange 52 at the outer end is inserted into the end of the spring 48, one at each end.

Typical dimensions & materials are as follows:
arming-wire retaining ring — 0.173 inch steel rod; ¾ inch outer diameter;
cable — 0.100 inch steel; about 16 inch in total (undoubled) length;
coil spring — 0.040 inch spring steel; 30 coils; 3¾ inch free length; 0.297 I.D.

To place the extension member 38 over the pad and bolt so that it loops around the sway brace arm and cannot easily be pulled off, the spring is pulled down toward the arming-wire retaining ring 36 which enlarges the sway-brace-arm attachment loop 40 allowing it to be slipped easily over the pad 20 and then up and over the sway brace nut 18 and upper end of the sway brace bolt 16. The loop 40 is then placed around the sway brace arm 14, as shown in FIG. 3. It does not come off once the spring is released since this action decreases the size of the attachment loop 40 so that it will not pass over the bolt and pad. The extension member 38 thus remains on the sway brace arm 14 and can be reused with other bombs.

The arming-wire retaining loop 36 is not absolutely essential to the invention, although preferable, since the arming-wire can be passed through and retained by the ring attachment loop 44.

It is obvious, of course, that the invention may be used with any of the other arming wires employed with aircraft bombs such as the bomb-fuze arming wire.

Furthermore, it is only necessary that the collar means 50' encircling the part of the doubled cable forming the large, or sway-brace-arm attachment, loop 40 be movable. The other collar means 52 can be fixed or the spring can be attached fixedly to the cable or swaging sleeve 46', although having a flange against which the spring can abut is preferable.

Obviously, many modifications and variations of the present invention are possible in light of the above teachings. It is therefore to be understood that, within the scope of the appended claims, the invention may be practiced otherwise than as specifically described.

What is claimed is:

1. An arming wire release system comprising: a bomb rack;
    a bomb having fins;
    an arming wire permanently secured to said bomb;
    a reusable arming wire pull out extension member comprising:
    cable means comprising a cable having ends which are doubled back along the longside, the free ends of being fastened to the long side near one end thereof so as to form a loop at each end thereof;
    bias means through which said doubled cable passes, said bias means being intermediate the ends of said doubled cable; and
    slidable means encircling said looped cable and coupled to said bias means at one end thereof, said bias means and slidable means being resiliently forceable back to allow one of said end loops of said cable to expand in size;
    said expanded end loop coupled to the bomb rack;
    said arming wire passed through said other end loop;
    whereby when said bomb is released, said arming wire is pulled through said other loop and enables the bomb fins to erect.

2. A system as in claim 1, further including a ring which is linked with said first small loop.

3. A system as in claim 2, wherein said bias means comprises a coil spring in the shape of a cylinder, said cable comprising steel.

4. A system as recited in claim 3 wherein said slidable means comprises a collar encircling said doubled cable movable with respect to said cable.

5. A system as in claim 4, further including swage sleeve means, said free ends of said cable being fastened to said long side by said swage sleeve means.

* * * * *